(12) United States Patent
Winkler

(10) Patent No.: US 6,731,929 B2
(45) Date of Patent: May 4, 2004

(54) APPARATUS, AND AN ASSOCIATED METHOD, FOR DISPLAYING PACKET-BASED DATA AT MOBILE STATION

(75) Inventor: Thomas Winkler, Vancouver (CA)

(73) Assignee: Nokia Corporation, Espoo (FI)

( * ) Notice: Subject to any disclaimer, the term of this patent is extended or adjusted under 35 U.S.C. 154(b) by 448 days.

(21) Appl. No.: 09/752,865

(22) Filed: Dec. 28, 2000

(65) Prior Publication Data

US 2002/0086664 A1 Jul. 4, 2002

(51) Int. Cl.$^7$ ................................................ H04B 7/20
(52) U.S. Cl. .................... 455/414.4; 455/415; 370/352; 370/354
(58) Field of Search ........................... 455/414.3, 414.4, 455/415, 426.1, 456.3, 553.1, 552.1, 556.1, 566; 370/352, 353, 354, 355, 356

(56) References Cited

FOREIGN PATENT DOCUMENTS

| EP | 0 869 688 A2 | 10/1998 |
|----|--------------|---------|
| WO | WO 00/54177 | 9/2000 |

*Primary Examiner*—Nay Maung
*Assistant Examiner*—Tanmay Lele

(57) ABSTRACT

Apparatus, and an associated method, for a radio communication system, such as a cellular communication system which provides also for packet data communications. Packet-formatted data, such as a web page or other display retrievable from a packet data network device is displayable at a mobile station concurrent with operation of the mobile station to effectuate another communication session, such as a voice call. The packet data is accessed and retrieved automatically upon initiation of a communication session, such as a voice call, initiated with a correspondent node.

20 Claims, 4 Drawing Sheets

APPARATUS, AND AN ASSOCIATED METHOD, FOR DISPLAYING PACKET-BASED DATA AT MOBILE STATION

The present invention relates generally to a manner by which to display packet-based data, such as a web-based display, at a mobile station operable in a radio communication system concurrent with operation of the mobile station pursuant to a voice, or other, call. More particularly, the present invention relates to apparatus, and an associated an associated method, by which automatically to access a portal web site, or other location, at which the packet-based data is stored and to retrieve the data for display at the mobile station upon initiation of the voice call between the mobile station and another communication station. Web data retrieved from the portal web site, or other location, is automatically displayed at the mobile station during call initiation with, or by, the other communication station.

BACKGROUND OF THE INVENTION

A communication system is formed of, at a minimum, a sending station and a receiving station between which information is communicated. A communication channel is formed between the sending and receiving stations, and the information to be communicated by the sending station to the receiving station is communicated thereon. A wide variety of different types of communication systems have been developed and are regularly utilized to effectuate communication of information between the sending and receiving stations.

Advancements in communication technologies have permitted the development, and implementation, of new types of communication systems. Radio communication systems are exemplary of communication systems which have benefitted from advancements in communication technologies. New types of radio communication systems, as well as improvements to existing radio communication systems, have been made possible as a result of the advancements in communication technologies.

In a radio communication system, the communication channel formed between the sending and receiving stations is formed of a radio channel defined upon a radio link extending between the sending and the receiving stations. The radio link is defined, at least in part, by frequencies of the electromagnetic spectrum. Because a radio link is utilized to form the communication channel, the need to utilize wire line connections between the sending and receiving stations used in a conventional wire line communication system is obviated. A radio communication system inherently permits increased communication mobility in contrast to a conventional wire line communication system due to the formation of the radio channel upon a radio link. Also, as conventional wire lines are not required to interconnect the sending and receiving stations, the infrastructure costs which would otherwise be required to install a wire line communication system are significantly reduced in a radio communication system.

A cellular communication system is exemplary of a radio communication system which has been made possible due to advancements in communication technologies. A cellular communication system advantageously provides for radio communications with mobile stations which are positioned within a geographical encompassed by the network infrastructure of the communication system. When a mobile station is positioned within the geographical area encompassed by the communication system, telephonic communication is permitted through use of the mobile station.

A cellular communication system makes relatively efficient utilization of the portion of the electromagnetic spectrum allocated thereto and upon which the radio channels are defined. The relatively efficient utilization of the allocated, electromagnetic spectrum is provided by the positioning of a plurality of spaced-apart, fixed-site transceivers which form portions of the network infrastructure of the communication system. Through the use of the plurality of fixed-site transceivers, a mobile station is likely to be positioned in proximity to at least one of the transceivers. Only relatively low-power signals are needed to communicate information between the mobile station and a fixed-site transceiver with which the mobile station is in proximity. As only relatively low-power signals are required to be generated, the same frequency channels can be reused at different locations throughout the geographical area encompassed by the cellular communication system according to a cell reuse scheme.

Various standards have been promulgated relating to various types of cellular, as well as other, communication systems. And, various types of cellular, as well as other, communication systems have been constructed corresponding to such standards. Several of such standards, for instance, make use of digital communication techniques. Digital communication techniques are utilized for the effectuation of both circuit-switched communications as well as packet-based communications.

One exemplary standard which has been promulgated, and pursuant to which cellular communication systems have been constructed, is a standard referred to as the GSM (Global System for Mobile communications). Another standard is a USDC (United States Digital Cellular) communication system. The GSM and USDC communication systems utilize a TDMA (Time Division Multiple Access) scheme. Another exemplary standard which has been promulgated, and pursuant to which various cellular communication systems have been constructed, utilizes a CDMA (Code Division Multiple Access) scheme.

Improvements to such systems have permitted the communication of packet-based data such as that utilized in communications by way of the Internet backbone. GPRS (General Packet Radio Service) for GSM, EDGE (Enhanced Data rates for GSM Evolution) for TDMA, and 1XRTT for CDMA set forth system requirements for the communication of web-based communications with a mobile station. When a communication system, and the mobile stations operable therein, are capable of communicating by way of the Internet backbone, or other packet data network, packet-based data is displayable at a display device of the mobile station. Web pages, for instance, are displayable at the display screen of such mobile stations.

Such systems are relatively new, and the possibilities of improved communications permitted through the use of such systems have not yet been fully explored. Any manners by which additional communication techniques permitted through the implementation of such systems would advantageously facilitate improved communication services.

It is in light of this background information related to the effectuation of power control in a communication system that the significant improvements of the present invention have evolved.

SUMMARY OF THE INVENTION

The present invention, accordingly, advantageously provides apparatus, and an associated method, by which to display packet-based data, such as a web-based display at a mobile station operable in a radio communication system concurrent with operation of the mobile station pursuant to a voice call.

Through operation of an embodiment of the present invention, a manner is provided by which automatically to access a portal web site, or other location, at which the packet-based data is stored. The data, once accessed, is retrieved, and then displayed at the mobile station upon initiation of the voice call between the mobile station and another communication station.

A data base is maintained of the portal web site, or sites, with the communication station with which a voice call is to be established. When the voice call is initiated with, or by, the other communication station, the data base is accessed to obtain an address associated with the portal web site. The portal web site is then accessed to retrieve data stored thereat. When provided to the mobile station, the data is displayed at a user display of the mobile station while the mobile station remains separately operable pursuant to the voice call.

Web data retrieved from the portal web site, or other location, is automatically displayed at the mobile station during call initiation with, or by, the other communication station. Due to the automatic access to, and retrieval therefrom, of data stored at a portal web site, display at the display device of the mobile station appears to a user of the mobile station to be 'push' of web information from the other communication station. The display of the information appears automatically responsive to origination of a call at the mobile station to the other communication station or termination of a call generated at the other communication station at the mobile station.

When, for instance, the other communication station is a telephone station operated by a business entity, data associated with the business entity can be automatically displayed at the display device of the mobile station when a user of the mobile station places a call to the telephone station of the business entity. The information related to the business entity, in one implementation, is a logo associated with the business entity. In another implementation, other information is displayed, such as an announcement associated with the business entity including marketing information.

In one aspect of the present invention, a mobile station is operable automatically to generate a request for communication, by way of a radio link, upon a packet data communication network to obtain an address of a portal web site, or other location, associated with the other communication station. Once the identity of the address is obtained by the mobile station, the mobile station automatically accesses the portal web site and retrieves data therefrom. The data retrieved from the portal web site is displayed at the mobile station concurrent with communication by the mobile station with the other communication station. A circuit-switched communication session, for instance, can be carried out with the other communication station while the data retrieved from the portal web site is displayed at the mobile station, updated as appropriate.

In another aspect of the present invention, a data base is maintained in which identities of communication stations are indexed together with one or more addresses of portal web sites with which the communication stations are associated. The data base is maintained at a storage device connected to a packet data network, such as the Internet backbone. Contents of the data base are selectably accessible by other devices, such as a mobile station operable to communicate by way of the packet data network. Responsive to a request for an address associated with a communication station, the data base is accessed to retrieve the address associated with the communication station, and the address identity is returned to the requester, such as the mobile station.

In one implementation, a manner is provided by which a mobile station, separately operable pursuant both to communicate by way of a voice call and to communicate data with a portal web site, displays information retrieved from the portal web site. The information is retrieved and displayed automatically responsive to initiation of a voice call with another communication station. The identity of the other communication station is ascertained when a call is originated at the mobile station by detection of the dialing digits associated with the other communication station. When a call is terminated at the mobile station and originated by the other communication station, the dialing digits associated with the communication station are ascertained such as through performance of a caller ID service.

Once the dialing digits associated with the other communication station are determined, a request is generated for communication to a data base. The request is an inquiry to the data base to ascertain an address associated with the other communication station. The data base includes a listing of addresses associated with identitites of communication stations. For example, telephone numbers are indexed together with URL addresses. The address is ascertained and returned to the mobile station. And, the mobile station thereafter sends an inquiry addressed to the retrieved address. Data is thereafter downloaded to the mobile station for display at the mobile station. The voice call between the mobile station and the other communication station is separately effectuated, concurrent with display of the data at the mobile station.

In these and other aspects, therefore, apparatus, and an associated method, is provided for a communication system in which a mobile station is operable to communicate during a common time period with a first remote station and with a second remote station. The communication between the mobile station and the second remote station comprise packet data-based communication. Display at the mobile station of data generated at the second remote station is effectuated. An identifier detector is coupled to receive indications of identity indicia associated with the second remote station. The identifier detector detects the identity indicia associated with the first remote station upon initiation of communications between the first remote station and the mobile station. A request generator is coupled to the identifier detector. The request generator generates a request for a selected address indexed together with the identity indicia associated with the first remote station. The selected address identifies the second remote station. A request response detector is coupled to receive indications of a response returned to the mobile station responsive to generation of the request by the request generator. The request response detector detects values of the selected address indexed together with the identity indicia associated with the first remote station. A data retriever is coupled to the request response detector. The data retriever retrieves data from the second remote station for display at the mobile station.

A more complete appreciation of the present invention and to the scope thereof can be obtained from the accompanying drawings which are briefly summarized below, the following detailed description of the presently preferred embodiments of the invention, and the appended claims.

BIREF DESCRIPTION OF THE DRAWINGS

DETAILED DESCRIPTION

Figure 1:
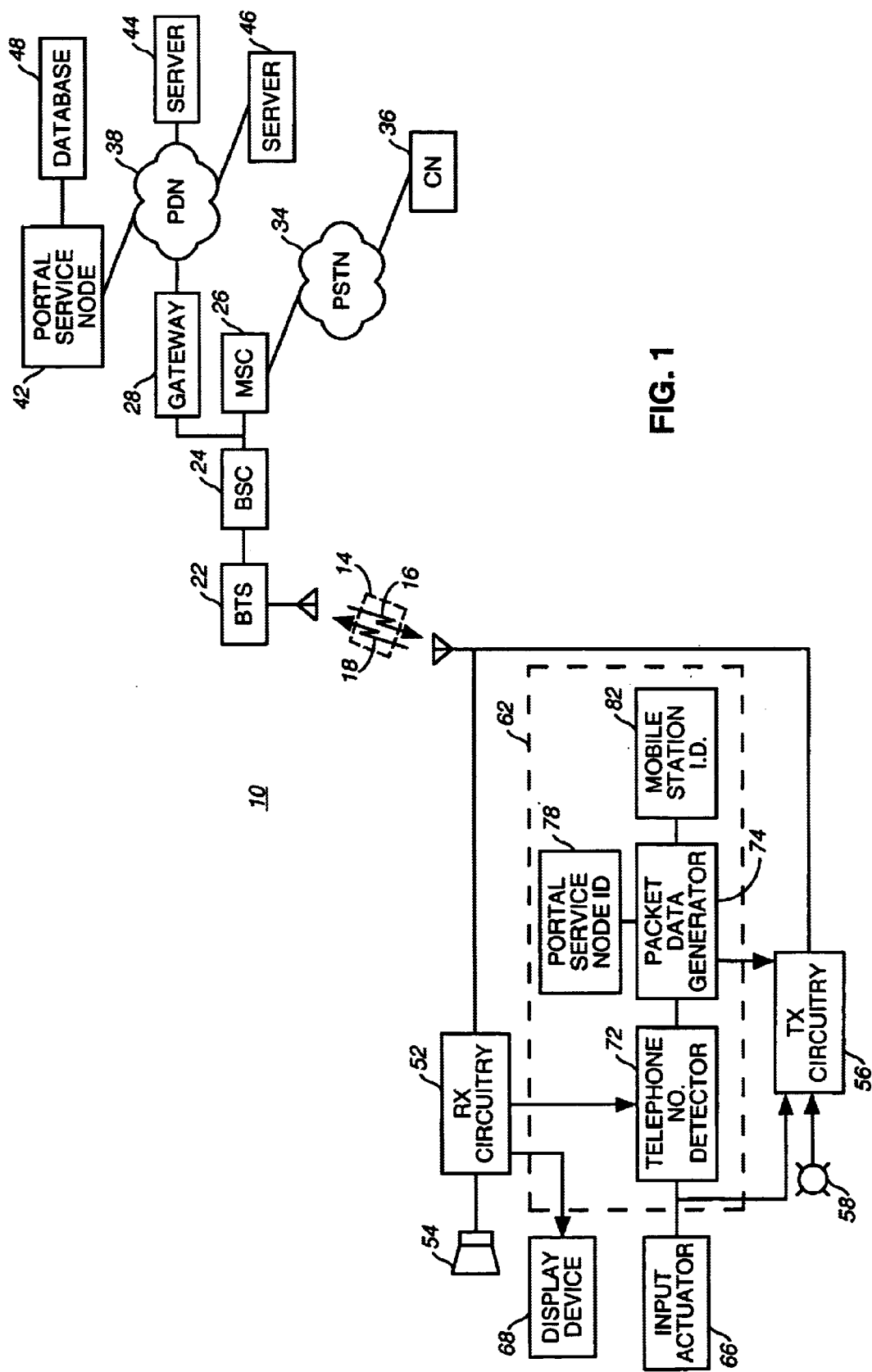
FIG. 1 illustrates a functional block diagram of a radio communication system in which an embodiment of the present invention is operable.

Referring first to FIG. 1, a communication system, shown generally at 10, provides for radio communications with a mobile station 12 by way of radio links 14. In the exemplary implementation, the communication system 10 forms a cellular communication system which provides for packet communications. For instance, the communication system 10 is representative of a GSM/GPRS (Global System for Mobile Communications/General Packet Radio Service), a TDMA/EDGE (Time Division Multiple Access/Enhanced Data rates for GSM Evolution) or CDMA/1XRTT (Code Division Multiple Access 1XRTT) communication system. Each of these communication systems permits telephonic communication of voice and non voice data for both circuit-switched and packet-switched communications.

It should be noted at the outset, of course, that operation of an embodiment of the present invention is similarly also possible in other types of radio, and other, communication systems. Therefore, while the following description shall describe operation of an embodiment of the present invention with respect to a cellular communication system, operation of other embodiments of the present invention can analogously be described with respect to any of various other types of communication systems to display packet-based data at the mobile station concurrent with effectuation of a voice call at the mobile station.

In operation of the communication system, two-way communications are permitted between the mobile station 12 by way of radio channels defined upon the radio link 14. Here, forward link signals 16 are communicated to the mobile station upon forward link channels defined upon the radio link. And, reverse link signals are transmitted by the mobile station upon reverse link channels defined upon a reverse link 18 of the radio link.

The communication system includes network infrastructure forming a radio access network (RAN) part of the communication system. Here, the network infrastructure is shown to include a base transceiver station (BTS) 22, a base station controller (BSC) 24, a mobile switching center (MSC) 26, and a packet data gateway (GW) 28. The base transceiver station is operable to transceive communication signals with the mobile station 12 by way of the forward and reverse link channels defined upon the radio link 14. The base station controller is operable, amongst other things, to control operations of the base transceiver station. The mobile switching center is coupled to the base station controller and is operable to perform switching operations in the formation of circuit-switched communications with the mobile station. And, the gateway 28 provides for packet-switched connections to permit packet-based communications with the mobile station.

The mobile switching center is coupled to a circuit switched network, here a public service telephonic network (PSTN) 34. A correspondent node (CN) 36 is coupled to the PSTN. Circuit-switched communications are permitted between the mobile station 12 and the correspondent node 36 through the formation of a communication path between the correspondent node and the mobile station by way of the PSTN, the MSC, the BSC, the BTS, and the radio link.

The gateway 28 is coupled to a packet data network (PDN) 38, such as the Internet backbone. Nodes coupled to the packet data network include a portal service node 42 and a plurality of web site servers, of which two servers 44 and 46 are shown in the Figure. The servers 44 and 46 are each identified by a unique address, here a URL utilized in the world wide web (WWW). The portal service node 42 is analogously also uniquely identified. A data base 48 formed at a storage device is connected to, forms a portion of, the portal service node. The data base includes identifiers which uniquely identify correspondent nodes, such as the correspondent node 36 and URLs of one or more servers, or other devices, coupled to the packet data network. The data base is accessed during operation of an embodiment of the present invention to retrieve one or more URL addresses to be used by the mobile station 12 to access, and retrieve data from, the accessed server. Once retrieved, the data is displayable at the mobile station.

The mobile station 12 is here shown to be formed of a receive portion including receive circuitry 52 to which a data sink, here a speaker 54, is coupled. The mobile station also includes a transmit portion including transmit circuitry 56 and a data source, here a microphone 58. A user of the mobile station is able to communicate telephonically by speaking into the microphone and by listening to the speaker 54.

The mobile station also includes control circuitry 62 coupled to the receive and transmit circuitry 52 and 56, respectively, of the receive and transmit portions of the mobile station. The control circuitry 62 includes functional elements operable pursuant to an embodiment of the present invention. In the exemplary implementation, the control circuitry includes processing circuitry, and the functional elements shown to form portions of the control circuitry comprise algorithms executable by the processing circuitry. In other implementations, the operations represented by the functional elements are implemented in other manners. The mobile station is further shown to include an input actuator 66 and a display device 68. The input actuator provides for user actuation thereof to enter, for instance, dialing digits which form telephone numbers of other communication stations. And, the display device forms a user display upon which data received at the mobile is displayable. The speaker 54, microphone 58, input actuator 66, and display 68 form the user interface of the mobile station.

An embodiment of the present invention is operable to retrieve data stored at a server, such as the server 44 and 46 upon initiation of a communication session between the mobile station and a correspondent node, such as the node 36. The data is retrieved and displayed automatically upon initiation of the communication session between the mobile station and the correspondent node.

The control circuitry includes a telephone number detector 72 coupled to the receive circuitry 52 and to the input actuator 66. The telephone number detector detects the dialing digits which uniquely identify the correspondent node 36. When a call is originated at the mobile station, the dialing digits input by way of the input actuator 66, such as through actuation thereof by a user of the mobile station or through retrieval from a memory location (not shown) of the mobile station, are detected by the telephone number detector. When a call, originated at the correspondent node is terminated at the mobile station, the telephone number of the correspondent node is provided to the receive circuitry 52, also to be detected by the telephone number detector. Thereby, when a call is originated at, or terminated at, the mobile station, the telephone number detector detects the identity of the correspondent node with which the communication session is to be effectuated.

The telephone number detector is coupled to a packet data generator 74. The packet data generator 74 is operable to generate a packet-formatted inquiry directed to the portal service node. The inquiry includes the telephone number of the correspondent node 36. The inquiry inquires of the portal service node of a URL, or other address, of a server, such as the server 44 or 46, indexed together with the telephone number of the correspondent node stored at the data base 48.

When the inquiry is received at the portal service node, the data base is searched to obtain the URL address associated with the telephone number contained in the inquiry. When the URL address is determined, a reply is returned to the mobile station by the portal service node to indicate the URL address.

In the formation of the packet-based inquiry, in addition to the telephone number detected by the detector 72, the packet is addressed to the portal service node with the address of the portal service node retrieved from the element 78. And, the identity of the mobile station also forms a portion of the packet-formatted inquiry. The identity of the mobile station is here represented to be retrieved from the element 82. The elements 78 and 82 comprise memory elements, for instance.

Once the address of the server associated with the correspondent node is returned to the mobile station, the packet data generator is operable to generate a packet-formatted inquiry to the address of the appropriate server. The inquiry is sent by way of the radio link, the network infrastructure of the communication system, through the packet data network, to be received at the appropriate server. Data at the server is accessed and returned to the mobile station 12 to be displayed at the display device 68.

Concurrent with the inquiry to the portal service node, and the request of the server, voice communications between the mobile station and the correspondent node are established. Thereby, packet-based data is pushed onto the display device 68 during the same period in which the communication session is established between the mobile station and the correspondent node. Thereby, through operation of an embodiment of the present invention, the data is caused to be displayed upon the display device 68 automatically, without separate request therefor by the user of the mobile station. A business logo associated with the business of the correspondent node, personal user data published by a called party, for example, a picture, an out-of-office notification, special offer information, and announcements, etc. are all displayable at the display device 68 merely upon initiation of a communication session between the correspondent node and the mobile station.

Figure 2:
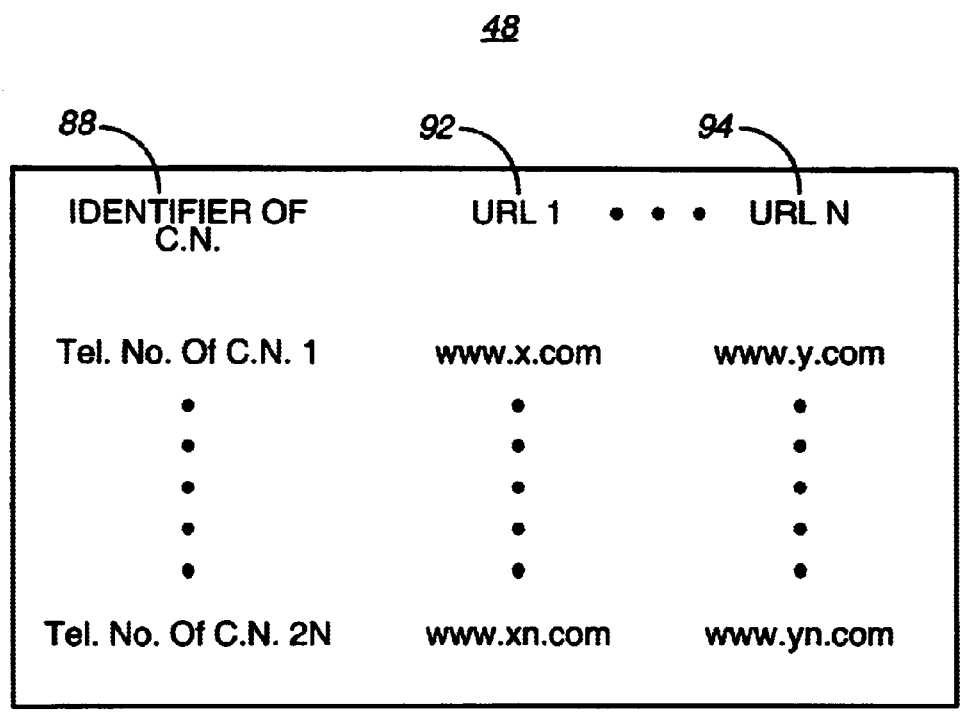
FIG. 2 illustrates a representation of a data base formed pursuant to an embodiment of the present invention and which forms a portion of the communication system shown in FIG. 1.

FIG. 2 again illustrates the data base 48. The data base includes an index of identifiers which identify correspondent nodes, such as the correspondent node 36. The identifiers, in the exemplary implementation, are formed of the telephone numbers associated with the correspondent nodes. The identifiers are listed in the column 88. One or more URL, or other, addresses are indexed together with the telephone numbers of their associated correspondent nodes. Columns 92 and 94 represent the addresses associated with the correspondent nodes. A selected address is returned by the portal service node to the mobile station responsive to the inquiry made by the mobile station. In one implementation, more than one address is provided to the mobile station. In another implementation, selection of which address to return to the mobile station is dependent upon the identity of the mobile station. The data base is updateable by an operator of the portal service node and is expandable in size and dimension, as needed.

Figure 3:
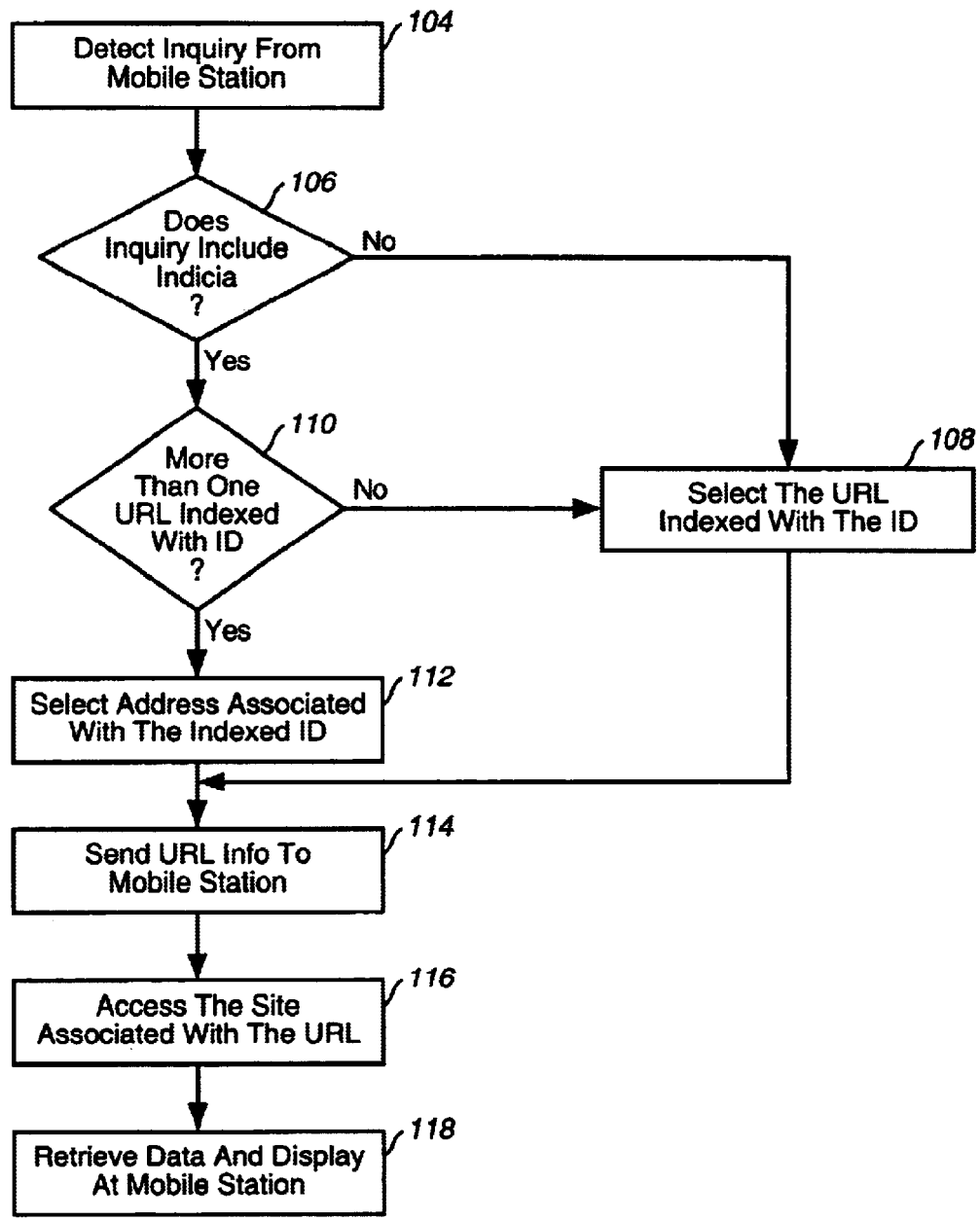
FIG. 3 illustrates a flow chart representative of operation of an embodiment of the present invention.

FIG. 3 illustrates a flow chart, shown generally at 102, which represents operation of an embodiment of the present invention by which automatically to retrieve data to be displayed at a display device of a mobile station responsive to initiation of communications with a correspondent node. Concurrent display of data at the display device of the mobile station together with effectuation of a communication session with a correspondent node is provided through operation of an embodiment of the present invention.

First, and as indicated by the block 104, detection is made of an inquiry generated by another communication station for an address, such as a URL, associated with a telephone number or other indicia associated with a correspondent node.

A decision is first made, indicated by the decision blcok 106, as to whether the inquiry include indicia associated with the communication station which initiated the inquiry. If not, the no branch is taken to the block 108 at which determination is made of the URL, or other address, associated with the telephone number or other indicia contained in the inquiry.

If, conversely, a determination is made at the decision block 106 that indicia associated with the inquiring communication station is contained in the inquiry, the yes branch is taken to the decision block 108.

At the decision block 108, a determination is made as to whether a look-up table contains more than one URL, or other address, associated with the telephone number, or other indicia, of the correspondent node. If not, a no branch is taken to the decision block 108. Otherwise, the yes branch is taken to the block 112.

At the block 112, a selection of one of the URLs, or other addresses, associated with the telephone number of the correspondent node is selected. Then, and as indicated by the block 114, the URL information is sent to the mobile station.

Then, and as indicated by the block 116, the mobile station sends a request to the site associated with the address provided to the mobile station to access data stored thereat. Responsive thereto, the site is accessed, the data is retrieved, and returned to the mobile station. Once received at the mobile station, the data is displayed, indicated by the block 118.

Figure 4:
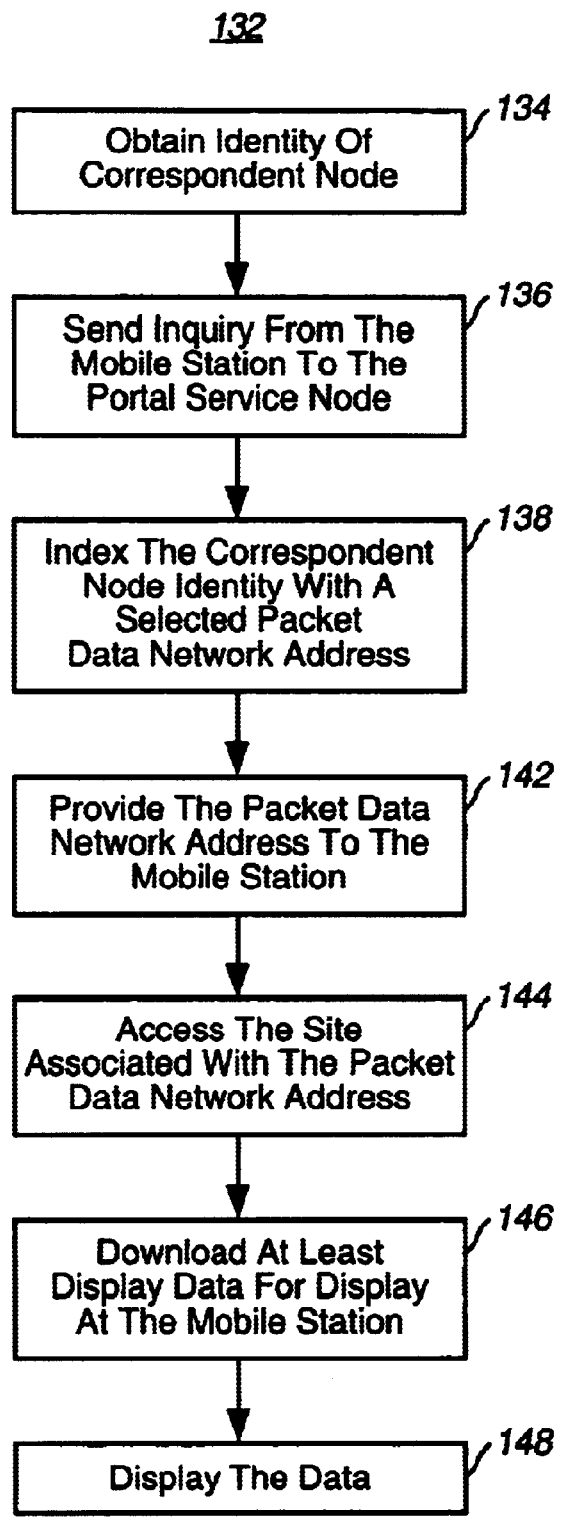
FIG. 4 illustrates a method flow diagram listing the method steps of the method of an embodiment of the present invention.

FIG. 4 illustrates a method flow diagram, shown generally at 132. The method 132 is operable to facilitate display at a mobile station of data generated at a packet data network device concurrent with effectuation of a communication session with a correspondent node, such as a telephonic station.

First, and as indicated by the block 134, the identity of the correspondent node is obtained. The identity is obtained irrespective of whether the communication session between the mobile station and the correspondent node is originated at the mobile station or is to be terminated thereat.

Then, and as indicated by the block 136, an inquiry is sent by the mobile station to a portal service node coupled to the packet data network. The inquiry includes the identity of the correspondent node. A data base is coupled to the portal service node which contains a listing of identities of correspondent nodes and addresses of packet data network devices associated with the correspondent node.

As indicated by the block 138, the correspondent node identity is indexed together with a selected packet data network address associated with the correspondent node. And, as indicated by the block 142, the packet data network address is provided to the mobile station.

Thereafter, and as indicated by the block 144, the site associated with the packet data network address is accessed by the mobile station. The access is made by sending a packet-formatted inquiry to the device identified by the packet data network address. Then, and as indicated by the block 146, display data is retrieved from the device associated with the packet data network address, and the display data is downloaded to the mobile station. Once received at the mobile station, the data is displayed, indicated by the block 148, upon a display device of the mobile station Thereby, a manner is provided by which to display packet-based display data at a mobile station display device concurrent with operation of the mobile station pursuant to a voice call with another correspondent node.

The previous descriptions are of preferred examples for implementing the invention, and the scope of the invention should not necessarily be limited by this description. The scope of the present invention is defined by the following claims.

I claim:

1. In a communication system in which a mobile station is operable to communicate during a common time period with a first remote station and with a second remote station, the communication between the mobile station and the second remote station comprising packet data-based communication, an improvement of apparatus for effectuating display at the mobile station of data generated at the second remote station, said apparatus comprising:

an identifier detector coupled to receive indications of identity indicia associated with the second remote station, said identifier detector for detecting the identity indicia associated with the first remote station upon initiation of communications between the first remote station and the mobile station;

a request generator coupled to said identifier detector, said request generator for generating a request for a selected address selected from at least one address indexed together with the identity indicia associated with the first remote station, the selected address identifying the second remote station;

a request-response detector coupled to receive indications of a response returned to the mobile station responsive to generation of the request by said request generator, said request-response detector for detecting values of the selected address indexed together with the identity indicia associated with the first remote station;

a data retriever coupled to said request-response detector, said data retriever for retrieving data from the second remote station for display at the mobile station.

2. The apparatus of claim 1 wherein the communications between the first remote station and the mobile station are initiated at the mobile station as a call originated thereat to the first remote station, and wherein said identifier detector detects origination of the call at the mobile station.

3. The apparatus of claim 2 wherein the call originated at the mobile station is initiated by generation of dialing digits associated with the first remote station and wherein said identifier detector detects the generation of the dialing digits at the mobile station.

4. The apparatus of claim 1 wherein the communications between the first remote station and the mobile station are initiated by the first remote station as a call to be terminated at the mobile station, and wherein said identifier detector detects termination of the call at the mobile station.

5. The apparatus of claim 4 wherein the first remote station is identified by dialing digits, wherein termination of the call at the mobile station includes making the dialing digits available to the mobile station, and wherein said identifier detector detects the dialing digits which identify the first remote station and which are made available to the mobile station.

6. The apparatus of claim 5 wherein the communication system provides a caller identification (caller ID) service and wherein said identifier detector detects the dialing digits which identify the first remote station pursuant to performance of the caller identification service.

7. The apparatus of claim 1 wherein the request generated by said request generator comprises a packet data-based communication.

8. The apparatus of claim 7 wherein the selected address for which said request generator generates the request comprises a URL address.

9. The apparatus of claim 1 wherein the request generated by said request generator is formatted according to a packet formatting scheme to form a packet formatted request.

10. The apparatus of claim 9 wherein the communication system comprises a packet data network and wherein the packet-formatted request generated by said request generator is communicated upon the packet data network.

11. In the communication system of claim 10, a further improvement of apparatus coupled to the packet data network, said apparatus comprising:

a request detector coupled to receive communications communicated upon the packet data network, said request detector for detecting the packet-formatted request generated by said request generator.

12. The apparatus of claim 11 further comprising a storage device coupled to said request detector, said storage device for storing a data base, the data base containing the identity indicia associated with the first remote station and the selected address indexed together therewith.

13. The apparatus in claim 12 wherein said request detector further accesses the data base stored at said storage device to retrieve the selected address indexed together with the identity indicia associated with the first remote station.

14. The apparatus of claim 13 further comprising a response generator coupled to receive indications of the selected address once accessed by said request detector, said response generator for generating a response containing values identifying the selected address.

15. The apparatus of claim 14 wherein the response generated by said response generator comprises a packet-formatted response and is communicated to the mobile station by way of the packet data network and wherein said request-response detector detects the packet-formatted response.

16. The apparatus of claim 1 wherein the communication system comprises a packet data network, wherein the second remote station comprises a node coupled to the packet data network, and wherein said data retriever retrieves the data from the second remote station by way of the packet data network.

17. In a communication system in which a mobile station is operable to communicate during a common time period with a first remote station and with a second remote station, the communication between the mobile station and the second remote station comprising packet data-based communication upon a packet data network, an improvement of apparatus for effectuating display at the mobile station of data generated at the second remote station, said apparatus comprising:

a request detector coupled to receive communications communicated upon the packet data network, said request detector for detecting a request, generated by the mobile station and communicated by way of the packet data network, for a selected address indexed together with identity indicia associated with the first remote station, the selected address identifying the second remote station;

a storage device coupled to said request detector, said storage device for storing a data base, the data base containing the identity indicia associated with the first remote station and the selected address selected from at least one address indexed together therewith; and a response generator coupled to receive indications of the selected address indexed together with the identity indicia, said response generator for generating a response containing values identifying the selected address to be returned to the mobile station, the selected address to be used by the mobile station to retrieve the data generated at the second remote station for display thereat.

18. In a method for communicating in a communication system in which a mobile station is operable to communicate during a common time period with a first remote station and with a second remote station, the communication between the mobile station and the second remote station comprising packet data based communication, an improvement of a method for effectuating display at the mobile station of data generated at the second remote station, said method comprising:

detecting at the mobile station identity indicia associated with the first remote station upon initiation of communications between the first remote station and the mobile station;

generating at the mobile station a request for a selected address selected from at least one address indexed together with the identity indicia associated with the first remote station, the selected address identifying the second remote station;

detecting a response to the request generated during said operation of generating, the response containing values of the selected address indexed together with the identity indicia associated with the first remote station; and retrieving data from the second remote station for display at the mobile station.

19. The method of claim 18 wherein the request generated at the mobile station for the selected address is communicated by way of a packet data network to a packet-network-coupled apparatus, and wherein said method further comprises the operation, at the packet-network-coupled apparatus of:

detecting the request for the selected address indexed together with the identity indicia associated with the second remote station.

20. The method of claim 19 further comprising the operations of:

accessing a data base containing the identity indicia associated with the first remote station and the selected address indexed together therewith;

retrieving the selected address from the data base; and generating the response to the request generated during said operation of generating the request for the selected address.

* * * * *